(12) United States Patent
Petersen et al.

(10) Patent No.: US 8,419,118 B2
(45) Date of Patent: Apr. 16, 2013

(54) ADJUSTABLE MODULAR ROOF FOR VEHICLES

(75) Inventors: Kim Ahrenfeldt Petersen, Rønde (DK); Børge Christensen, Ebeltoft (DK); Alastair Murrey Hoegh Persson, Hundslund (DK)

(73) Assignee: Solardrive APS (DK)

( * ) Notice: Subject to any disclaimer, the term of this patent is extended or adjusted under 35 U.S.C. 154(b) by 38 days.

(21) Appl. No.: 12/745,004

(22) PCT Filed: Nov. 28, 2008

(86) PCT No.: PCT/DK2008/000422
§ 371 (c)(1),
(2), (4) Date: Aug. 31, 2010

(87) PCT Pub. No.: WO2009/095016
PCT Pub. Date: Aug. 6, 2009

(65) Prior Publication Data
US 2010/0314912 A1 Dec. 16, 2010

(30) Foreign Application Priority Data
Nov. 30, 2007 (DK) .......................... PA 2007 01710

(51) Int. Cl.
*B60R 99/00* (2009.01)
(52) U.S. Cl.
USPC .......................... 296/210; 52/173.3; 136/244
(58) Field of Classification Search .................. 296/210; 52/656.9, 173.3; 136/244
See application file for complete search history.

(56) References Cited

U.S. PATENT DOCUMENTS

| 4,233,085 | A | * | 11/1980 | Roderick et al. | 136/244 |
| 4,516,647 | A | * | 5/1985 | Novak | 180/2.2 |
| 6,474,729 | B2 | | 11/2002 | Patz et al. | |
| 6,799,398 | B1 | * | 10/2004 | Plevyak | 52/173.3 |
| 7,047,902 | B1 | * | 5/2006 | Little | 114/361 |
| 7,921,607 | B2 | * | 4/2011 | Thompson et al. | 52/60 |

(Continued)

FOREIGN PATENT DOCUMENTS
DE 19956576 A1 6/2001
WO 0194141 A1 12/2001

OTHER PUBLICATIONS

International Search Report PCT/DK2008/000422; Dated Mar. 18, 2009.

*Primary Examiner* — Lori Lyjak
(74) *Attorney, Agent, or Firm* — Cantor Colburn LLP

(57) ABSTRACT

A canopy for electric vehicles is composed of extruded profiles containing shelves for placement of photovoltaic panels, inside ceiling, integrated gutter and curtain slides, and a special universal rail system which allows the canopy to be mounted on vehicles of different brands with different horizontal distances between the uprights supporting the canopy of this type of vehicles, where the design of the profiles, linking them together, a ceiling with inlaid metal lattice, together with photovoltaic panels and the uprights also offers a more effective protection against the harmful effects of lightning than the known types of canopies, and a special control box is utilized that allows photovoltaic panels to be connected in parallel which reduces the harmful effects of shade on the panels and maximises the energy that may be transferred to different and higher battery voltages.

8 Claims, 3 Drawing Sheets

U.S. PATENT DOCUMENTS

| | | | |
|---|---|---|---|
| 7,921,843 B1* | 4/2011 | Rawlings | 126/623 |
| 2001/0039960 A1 | 11/2001 | Shugar et al. | |
| 2004/0216933 A1* | 11/2004 | Coale | 180/19.1 |
| 2004/0221524 A1 | 11/2004 | Poddany | |
| 2009/0133740 A1* | 5/2009 | Shiao et al. | 136/251 |
| 2009/0288891 A1* | 11/2009 | Budge | 180/2.2 |
| 2010/0236594 A1* | 9/2010 | Hammann | 135/143 |
| 2011/0204720 A1* | 8/2011 | Ruiz et al. | 307/66 |

\* cited by examiner

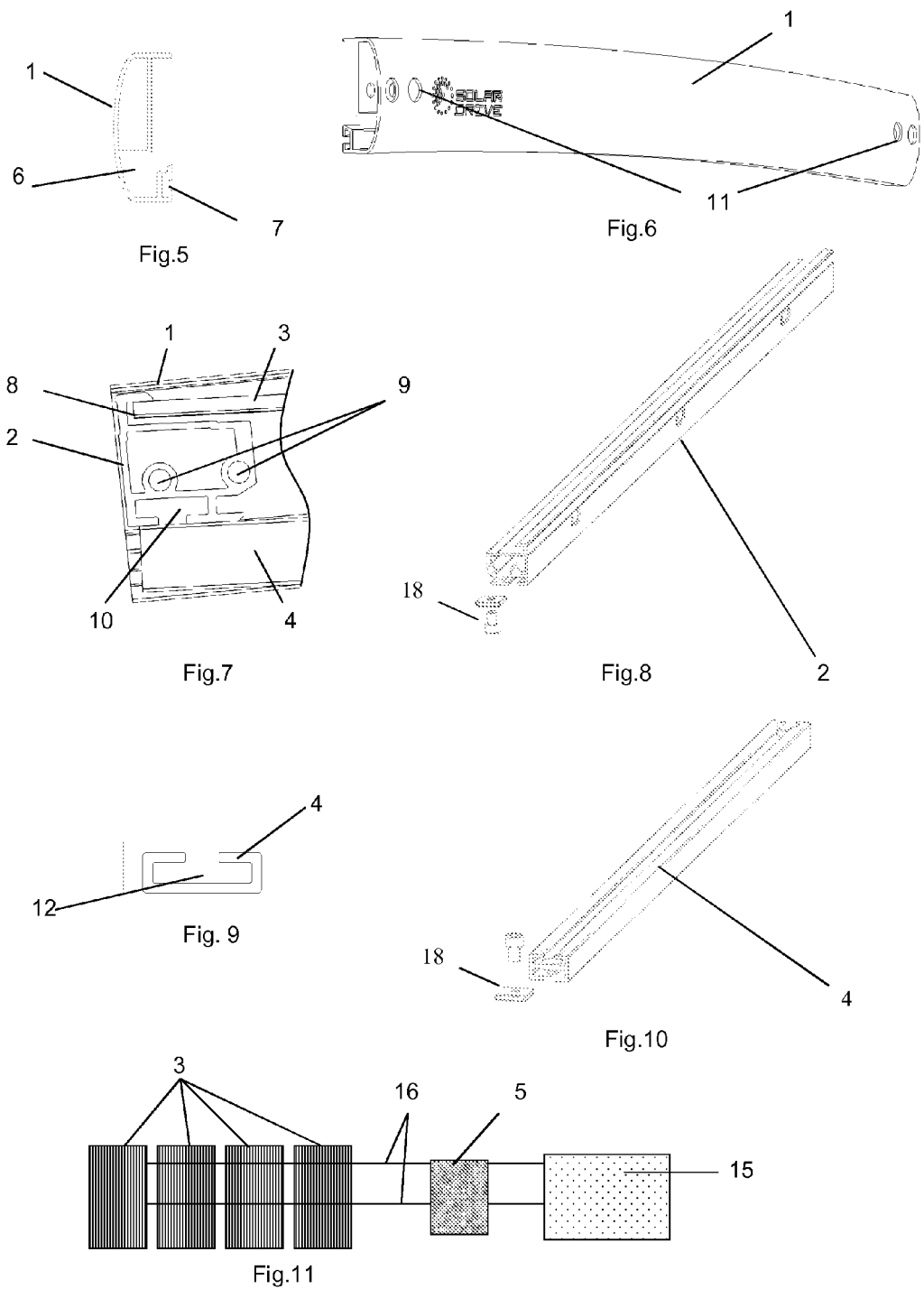

ADJUSTABLE MODULAR ROOF FOR VEHICLES

TECHNICAL FIELD

A multi adjustable modular canopy for electric vehicles is provided, particularly as a carrier for photovoltaic panels.

BACKGROUND

The present invention relates to a canopy for electric vehicles for passenger and goods transport, as known from golf courses and also used in many other contexts for these purposes. These vehicles are usually equipped with a canopy which only serves to protect from sunlight and rain and which mainly is made of plastic.

The existing solution is subject to various drawbacks, firstly it does not contribute to the energy supply of the vehicle and secondly gives very little protection against the dangers of lightning, which annually kill many people on golf courses around the world. Other shortcomings of existing golf car vehicle canopies are the lack of an efficient drainage of rain and lack of fixation means for curtains to protect against sun, wind and rain.

BRIEF SUMMARY

The invention is peculiar in that the proposed canopy is modular and composed of sections, preferably of a metal such as aluminum, containing profiles for the placement of photovoltaic panels as well as inner ceiling, together with integrated gutter and sliding rail for a curtain, and a special multi adjustable rail system which allows fitting the canopy to vehicles of different brands with different horizontal distances between the uprights, which usually supports a canopy on this type of vehicles. The design of the profiles, the linking of them together and a possible ceiling with inlaid metal grid or plate, together with photovoltaic panels constitutes a more effective protection against the harmful effects of lightning than the known types of canopies. Finally, the invention is peculiar by using a special electronic control box that allows the photovoltaic panels to be linked in parallel, which reduces the harmful effects of shade on the panels and converts a maximum of solar energy to be fed to the battery that may be one of several different and higher battery voltages.

The canopy may further include hinges that may be attached to the top of the upright members carrying the canopy in one end of the vehicle as well as arrangements for height adjustment in the opposite end, allowing the canopy, as a whole to be adjusted for more perpendicular solar influx to the photovoltaic panels, thus maximizing their power output. All uprights may further be equipped with devices that allow adjustment for perpendicular solar influx, manually or automatically.

BRIEF DESCRIPTION OF THE DRAWINGS

FIG. 5: Cross-section of the canopy frame
FIG. 6: Frame seen in perspective
FIG. 7: Cross-section of transverse profile
FIG. 8: Transverse profile seen in perspective
FIG. 9: Cross-section of mounting rails
FIG. 10: Mounting rail seen in perspective
FIG. 11: Schematic illustration of photovoltaic panel connection method

DETAILED DESCRIPTION

The following describes the invention with reference to the figures.

Figure 1:
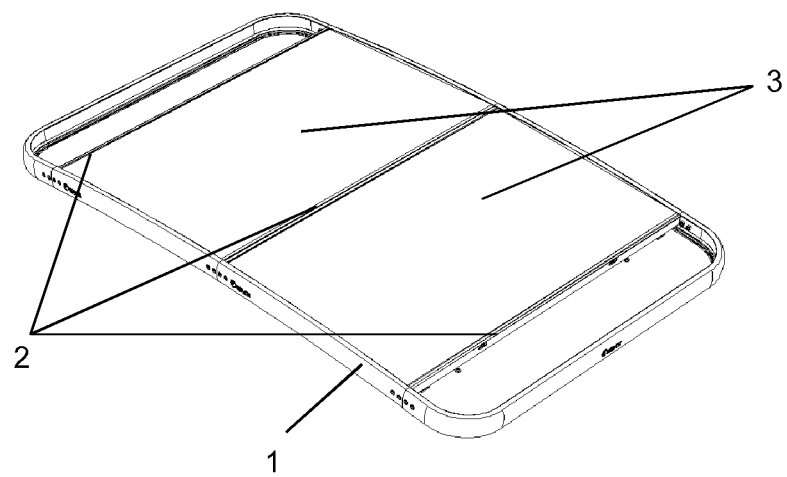
FIG. 1: The canopy seen in perspective from above

FIG. 1 shows canopy in perspective from above. 1 is an extruded frame, made of for example aluminum. 2 are transverse profiles for carrying photovoltaic panels 3 and affixed to the frame 1 with screws.

Figure 2:
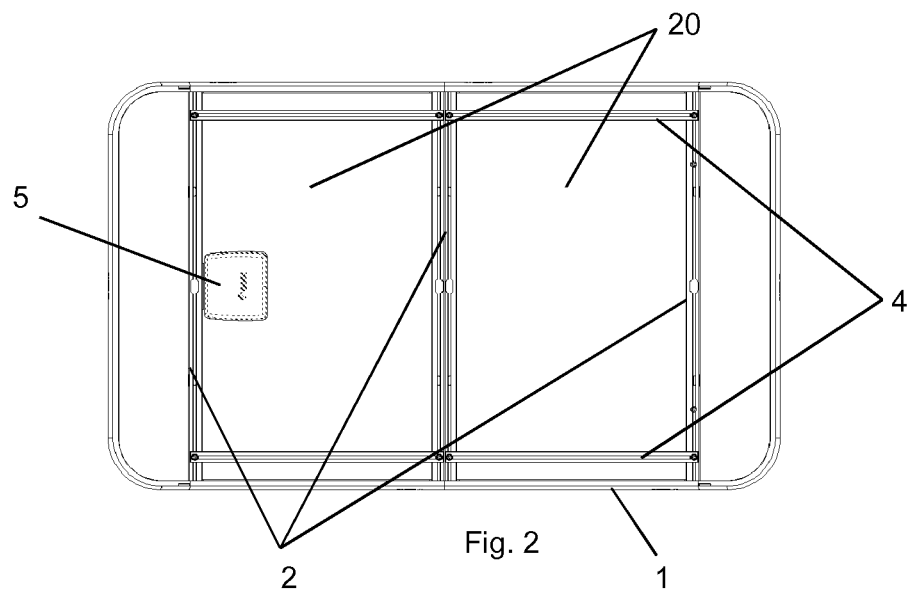
FIG. 2: The canopy seen from below

FIG. 2 shows canopy seen from below. In addition to frame 1 and transverse profiles 2 carrying photovoltaic panels 3 are shown mounting rails 4 and the control box 5.

Figure 3:
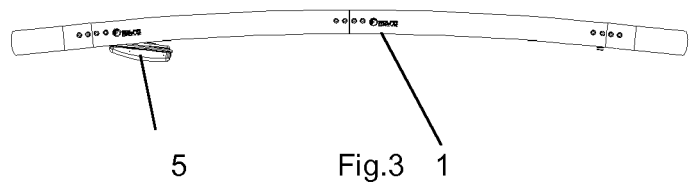
FIG. 3: Thee canopy seen from the side

FIG. 3 shows the side view of the frame 1 and the control box 5

Figure 4:
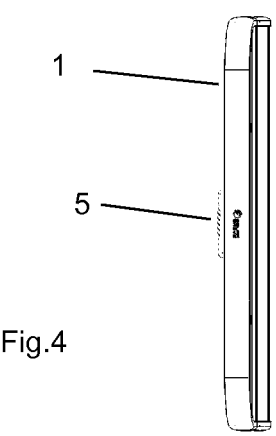
FIG. 4: The canopy seen from one end

FIG. 4 shows canopy from the end of the frame 1, also shown is the control box 5

FIG. 5 shows the cross-section of the frame 1 with the groove 6 which serves to collect rainwater and groove 7 which serves as the sliding rail for the suspension of curtains to protect the occupants from rain and wind.

FIG. 6 shows the frame 1 in perspective with holes 11 for the placement of screws for affixing the transverse profiles 2.

FIG. 7 shows the cross section of the transverse profiles 2 with shelf 8 for photovoltaic panels 3, channels 9 for clamping to the frame 1 and groove 10 for the location of bolt heads where the other end of the bolts fits through holes in the mounting rail 4 shown in FIG. 10.

FIG. 8 shows transverse profiles 2 in perspective.

FIG. 9 shows the cross section of the mounting rail 4 with the groove 12 intended for placement of bolt heads, where the other end of the bolts are passed through holes in the vehicle uprights and fastened with nuts.

FIG. 10 shows the mounting rail 4 with clamping device 18 seen in perspective.

FIG. 11 shows the photovoltaic panels 3 connected with wires 16 to the battery 15 through the controller 5.

The canopy is designed in modules so that the frame 1 lengthwise may comprise a number of side frames representing a number of photovoltaic panels for attachment to different sizes of vehicles. Through bolts whose heads may slide in the groove 10 of transverse profile 2 the mounting rails 4 may be positioned across to adapt to different distances between vehicle uprights. Mentioned bolts are passed through the appropriate holes in the mounting rail 4 and fastened with nuts. Likewise in the mounting rails 4 are inserted heads of bolts which may be shifted lengthwise in groove 12, the other ends being affixed to the vehicle uprights. It is obvious that these features can facilitate the installation of the canopy to different vehicles with varying horizontal distances between uprights, both along and across.

The canopy is multifunctional, partly by serving as protection against the weather, partly by serving as a carrier for photovoltaic panels 3, partly by diverting rainwater via the groove 6, FIG. 5, and further through a hose down through the uprights, partly by serving as carriers for curtains by means of groove 7, FIG. 7 and finally partly by providing better protection against the harmful effects of lightning because the photovoltaic panels together with the installation of metal frames and rails and the vehicle uprights functions as a Faraday cage. As additional lightning protection a ceiling 20 of a metal grid may be installed under the photovoltaic panels and be electrically connected to the rest of the canopy profiles.

FIG. 11 shows as an example, 4 solar panels 3, which number may be from one to many in electrical parallel, usually with the voltage 12 volts but other voltages are possible, connected to the control box 5, converting the electrical power to the battery 15 according to the Maximum Power Point Tracking (MPPT) principle. The battery is usually 48 volts but other voltages are possible. Control box 5 may be fitted with an indicator 17 showing the instantaneous power output of the photovoltaic panels. Various other connectors such as cigarette lighter connector and USB connector may be fitted to the control box 5.

Figure 12:
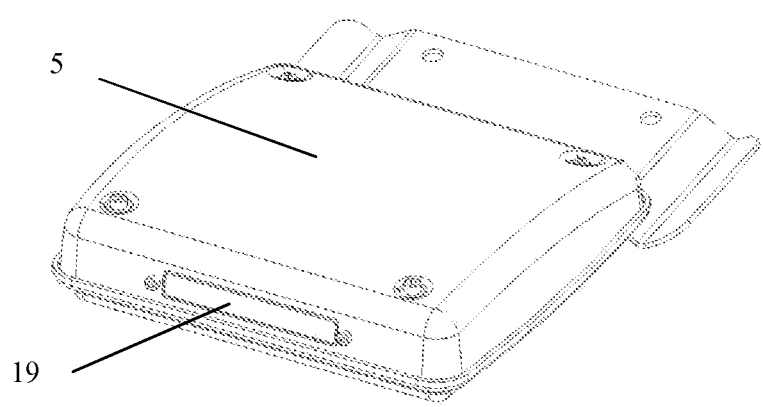
FIG. 12: Perspective view of the canopy and maximum power point tracker.

FIG. 12 shows the MPPT 5 having a display 19 for solar influx.

We claim:

1. Canopy carrying photovoltaic panels and built in modules for flexible mounting on electric vehicles comprising:
   transverse profiles connected to mounting rails with clamping devices that allows linear stepless fitting by means of grooves in said transverse profiles, and are fastened to the mounting rails;
   wherein the mounting rails are connected to uprights with clamping devices, that allows linear stepless fitting by means of said grooves in the mounting rails and are fastened to the uprights.

2. Canopy according to claim 1, further comprising a frame profile containing means for capturing rainwater and sliding means for a curtain.

3. Canopy according to claim 1, wherein the transverse profile contains a shelf for supporting photovoltaic panels, a groove for a linear stepless clamping to a mounting rail and channels for affixing the transverse profile to a frame.

4. Canopy according to claim 1, further comprising a ceiling including a metal net in electrical connection with other metal parts of the canopy and vehicle uprights 5. Canopy according to claim 1, wherein the canopy is in electrical contact with the vehicle uprights.

6. Canopy according to claim 1, wherein the photovoltaic panels are connected electrically in parallel.

7. Canopy according to claim 1 wherein power from the photovoltaic panels is maximized with maximum power point tracker whose output can be adjusted for different battery voltages 8. Canopy according to claim 7 wherein a maximum power point tracker is equipped with a display showing intensity of solar influx.

* * * * *